(12) United States Patent
Parker et al.

(10) Patent No.: US 11,172,343 B2
(45) Date of Patent: Nov. 9, 2021

(54) VEHICLE COMMUNICATION

(71) Applicant: INTEL CORPORATION, Santa Clara, CA (US)

(72) Inventors: Valerie J. Parker, Portland, OR (US); Soo Jin Tan, Bukit Mertajam (MY); Hassnaa Moustafa, Portland, OR (US); Dave Cavalcanti, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 16/490,214

(22) PCT Filed: Mar. 31, 2017

(86) PCT No.: PCT/US2017/025581
§ 371 (c)(1),
(2) Date: Aug. 30, 2019

(87) PCT Pub. No.: WO2018/182732
PCT Pub. Date: Oct. 4, 2018

(65) Prior Publication Data
US 2021/0076180 A1    Mar. 11, 2021

(51) Int. Cl.
*H04W 4/44*        (2018.01)
*H04W 4/80*        (2018.01)
*H04W 84/12*       (2009.01)

(52) U.S. Cl.
CPC .............. *H04W 4/44* (2018.02); *H04W 4/80* (2018.02); *H04W 84/12* (2013.01)

(58) Field of Classification Search
CPC .................................. H04W 4/44; H04W 84/12
See application file for complete search history.

(56) References Cited

U.S. PATENT DOCUMENTS

| 2011/0306353 | A1 | 12/2011 | Kim et al. | |
| 2017/0034774 | A1* | 2/2017 | Nathanson | H04W 48/16 |
| 2018/0213365 | A1 | 7/2018 | Yi et al. | |
| 2018/0242115 | A1* | 8/2018 | Kim | H04W 4/40 |
| 2019/0028862 | A1* | 1/2019 | Futaki | H04W 4/44 |

FOREIGN PATENT DOCUMENTS

| WO | 2017014514 A1 | 1/2017 |
| WO | 2017030348 A1 | 2/2017 |
| WO | 2017046979 A1 | 7/2018 |

OTHER PUBLICATIONS

International Search Report for PCT Application Serial No. PCT/2017025581 with completion and dated Dec. 13, 2017, 3 pages.

* cited by examiner

*Primary Examiner* — Qutbuddin Ghulamali
(74) *Attorney, Agent, or Firm* — Schiff Hardin LLP (57) ABSTRACT

A system and method for vehicle communication, including a computing device communicatively coupled with a roadside computing device disposed along a road, wherein the computing device is disposed remote from the road. The roadside computing device to communicate with a vehicle computing system of a vehicle on the road.

25 Claims, 7 Drawing Sheets

VEHICLE COMMUNICATION

CROSS REFERENCE TO RELATED APPLICATIONS

Pursuant to 35 U.S.C. § 371, this application is the United States National Stage Application of International Patent Application No. PCT/US2017/025581, filed on Mar. 31, 2017, the contents of which are incorporated by reference as if set forth in their entirety herein.

TECHNICAL FIELD

The present techniques relate generally to device communication and, more particularly, to communicatively coupling a network with a roadside computing device.

BACKGROUND

Vehicle-to-everything (V2X) communication and similar standards may involve the passing of information between a vehicle and other entity. The vehicular communication system may incorporate specific types of communication such as V2I (vehicle-to-infrastructure), V2V (vehicle-to-vehicle), V2P (vehicle-to-pedestrian), V2D (vehicle-to-device), V2G (vehicle-to-grid), and so on. V2X communication may be based at least in part on wireless local area network (WLAN) technology and work between vehicles, between vehicles and infrastructure, and between infrastructure devices, and so on. In particular examples, the radio technology may be standardized as part of the WLAN Institute of Electrical and Electronics Engineers (IEEE) 802.11 family of standards, and known as Wireless Access in Vehicular Environments (WAVE) in the United States and as Intelligent Transport Systems (ITS)-G5 in Europe.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
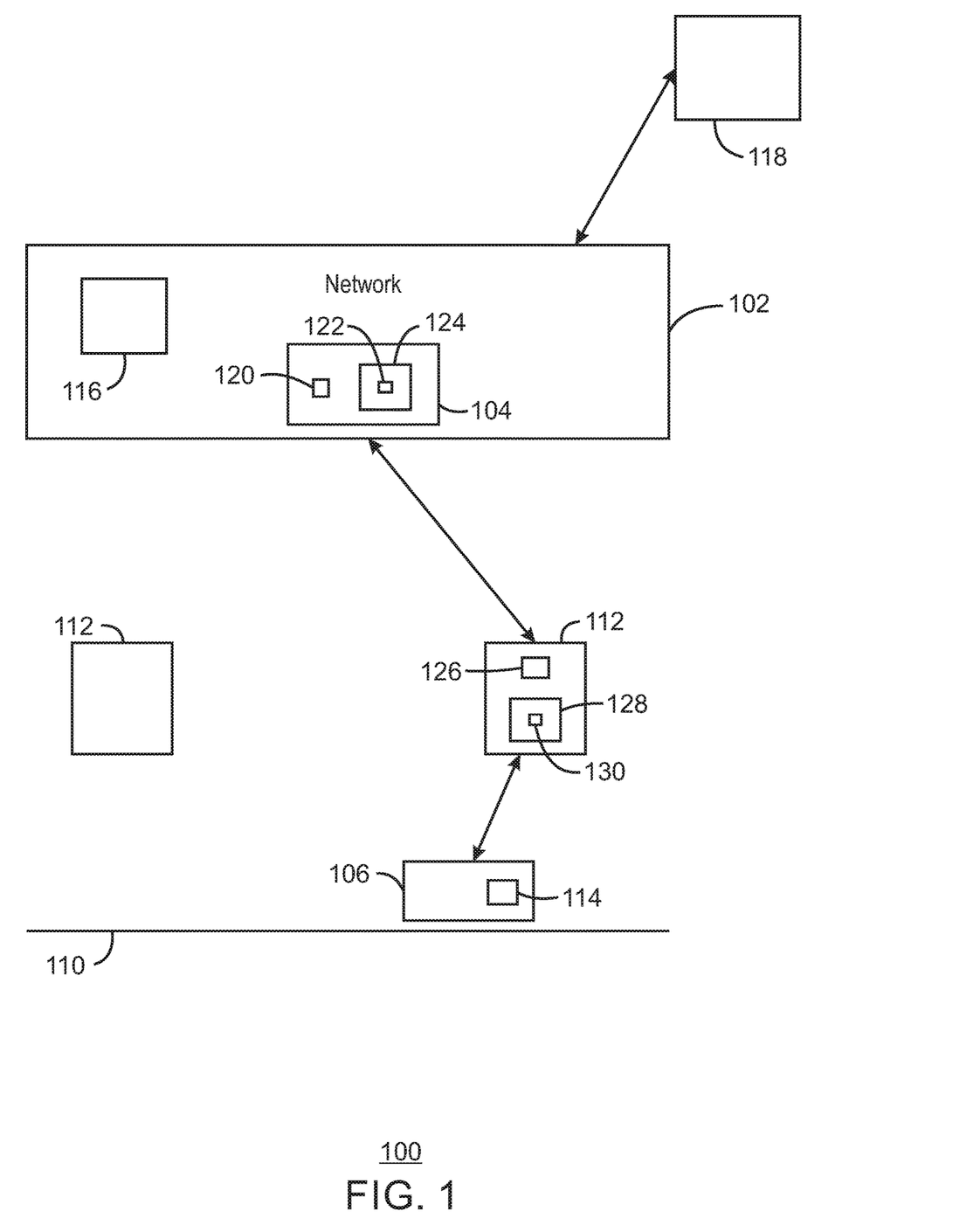
FIGS. 1-4 are diagrams of systems for vehicle communication in accordance with embodiments of the present techniques.

FIG. 1 is a system 100 for device communication (e.g., vehicle communication) in which a network 102 has a computing device 104 (e.g., an edge computing unit) that communicates with a device or vehicle 106 via another computing device such as a roadside computing device 112. In the context of the present disclosure, vehicle may be devices such as mobile device, internet-of-things (IoT) devices, drones, user equipment, automotive, etc. The roadside computing device 112 (e.g., roadside unit or RSU) is disposed along a road 110 in which the vehicle 106 travels or is parked. The computing device 104 may be disposed remote from the road 110 and from the vehicle 106. As used herein, "remote" may mean distant or far away. In some examples, "remote" is at least one kilometer in distance, and can be in any direction. In particular examples, "remote" is at least ten kilometers in distance.

The roadside computing devices 112 may be communicatively coupled with the computing device 104 via Ethernet, optical, wireless, or cellular, and the like. The network 102 may be, for example, an access network, an edge network, a mobile edge computing (MEC) network, and so forth. The network 102 may include a cellular network, cellular nodes or towers, wireless access points, edge devices, servers, cloud network including cloud servers, and so forth. The computing device 104 may be an edge device (e.g., a MEC server) of the network 102.

The roadside computing device(s) 112 may employ dedicated communication protocols such as dedicated short range communications (DSRC) or similar protocols. The DSRC may be one-way or two-way short-range to medium-range wireless communication channels for automotive use and a corresponding set of protocols (e.g., including open-source) and standards (e.g., in the United States, Europe, etc.). The DSRC may provide for communications between the vehicle 104 and the roadside computing devices 112 or RSUs. In some examples, the vehicle computing system 114 of the vehicle 106 may be a fog node expanding cloud computing to the vehicle 106.

The roadside computing devices 112 may communicate with the vehicle computing system 114. Moreover, the roadside computing devices 112 may operate independently from one another. Further, in the illustrated embodiment, the roadside computing devices 112 communicate with the network 102 via the computing device 104. Similarly, the computing device 104 may communicate with the vehicle computing system 114 of the vehicle 106 via the roadside computing device 112. Again, the roadside computing devices 112 may be communicatively coupled with the computing device 104 via Ethernet, optical, wireless, or cellular, or any combinations thereof.

As indicated for some examples, the network 102 may include cloud servers 116, and other devices, and the like. Moreover, in certain examples, an external entity 118 such as a supplier, service provider, technician, manufacturer, government organization, cellular device, etc. may supply and receive information to/from the vehicle computing system 114 via the network 102 and roadside computing device 112.

As mentioned, the computing device 104 may be an edge computing device. In a particular example, the computing device 104 is a mobile edge computing (MEC) device such as an MEC server or similar device. Mobile edge computing may provide information technology (IT) and cloud-computing capabilities within a radio access network (RAN). In some examples, MEC may be a network architecture that facilitates cloud computing capabilities and an IT service environment near or at the edge of the cellular network. MEC technology may be implemented at cellular base stations and/or multi-access wireless networks (e.g., Wi-Fi or others), and the like. Further, MEC technology may promote deployment of applications and services. Services can include traffic alerts, accident alerts, autonomous driving remote-control commands, n augmented virtual reality services, other applications, and so forth. Technical standards for MEC are being developed, for example, by the European Telecommunications Standards Institute.

As discussed, the computing device 104 may facilitate communication between the network 102 and the vehicle 106. Moreover, in some embodiments, the computing device 104 as an edge device may aggregate data from the roadside computing devices 112. Further, depending on the implementation, the computing device 104 can have less, the same, or more processing capability than the roadside computing devices 112. In some examples, the computing device 104 has more processing capability than the roadside computing devices 112.

In the illustrated embodiment, the computing device 104 has a hardware processor 120 such as a microprocessor, a central processing unit or CPU, and so forth. The processor 120 may be multiple processors or each processor 120 may have multiple cores. The computing device 104 has memory 122 such as non-volatile memory, volatile memory, and other types of memory. The nonvolatile memory may be a hard drive, read-only-memory or ROM, etc. The volatile memory may be random access memory or RAM, cache, etc. In the illustrated example, the memory 122 stores code 124, e.g., instructions, logic, etc., executable by the one or more processors 122. The code 124 may provide for communication with the roadside devices 112, so to communicate with the vehicle computing system 114 in certain examples. Indeed, the code 124 may be executed by the processor 120 to implement or facilitate implementation of the communication techniques discussed herein. Further, respective actions may be implemented by different computing devices 104 in the network 102. Also, the computing device 104 may include an application-specific integrated circuit (ASIC) customized for techniques described.

The roadside computing devices 112 may also have a hardware processor 126 such as a microprocessor, a CPU, and so forth. The roadside computing devices 112 have memory 128 such as non-volatile memory, volatile memory, and other types of memory. The memory 128 may store code 130, e.g., instructions, logic, etc., executable by the one or more processors 126. The code 130 may provide for communication with the network 102 and the computing device 104. Indeed, the code 130 may be executed by the processor 128 to facilitate implementation of the communication techniques discussed herein. Further, respective actions may be implemented by different roadside computing devices 112. Also, the roadside computing devices 112 may include an application-specific integrated circuit (ASIC) customized for features described. Lastly, the roadside computing devices 112 and the computing device(s) 104 may have network interface components (not shown) to facilitate coupling and communication with networks of various protocols. The network interface components may include a network adapter, network interface card (NIC), on-board network hardware/software, and the like.

In general, the present techniques may involve aspects of vehicle-to-everything (V2X) communication and similar standards. As mentioned, vehicle-to-everything (V2X) communication may be the passing of information between a vehicle and other entity. Again, the vehicular communication system may incorporate specific types of communication such as V2I, V2V, V2P, V2D, V2G, and so on. V2X communication may be based at least in part on WLAN technology and work directly between vehicles or the infrastructure. In particular examples, the radio technology may be standardized as part of the WLAN IEEE 802.11 family of standards and known in the US as WAVE and in Europe as ITS-G5.

Certain examples herein may provide for MEC support to roadside computing networks (e.g., DSRC) for V2X including V2V or similar implementations, and with vehicle information exchange and vehicle operations such as autonomous driving (AD), AD vehicles connectivity, and so forth. While the present techniques are not limited to a particular standard, embodiments may support or agree with relevant standards promulgated by the European Telecommunications Standards Institute (ETSI), Telecoms & Internet converged Services & Protocols for Advanced Networks (TISPAN), Open Fog Consortium, and others.

A MEC host or server may be a component in edge processing and analytics for V2X (e.g., including vehicle-to-vehicle, vehicle-to-Infrastructure, and vehicle-to-cloud) communications. Indeed, an MEC server may be a node in the Radio Access Network (RAN) hosting cloud services and replying to services requests and compute needs closer to data sources and service requestors. The data sources and service requestors may be a standard defined by the ETSI/TISPAN in certain examples.

MEC has been generally in a coexistence mode with a mobile or cellular node such as evolved Node B (eNodeB) but is extending to support multiple wireless access. The eNodeB is generally evolution of the element Node B in UMTS Terrestrial Radio Access (UTRA) of the Universal Mobile Telecommunications System (UMTS). The eNodeB may include hardware connected to the mobile phone network that communicates directly wirelessly with mobile user equipment (UE), similar to a base transceiver station (BTS) in Global System for Mobile communication (GSM) networks. Traditionally, a Node B has low functionality typically controlled, for example, by a radio network controller (RNC). However, with an eNodeB, separate controller elements may be avoided in certain examples and, therefore, potentially simplifying architecture and facilitating lower response times.

The ETSI/TISPAN has recently approved the change of MEC naming to Multi Access Edge Computing. As MEC is generally not considered as a road side unit (RSU) but typically as an access network component, MEC support to DSRC may be a gap without embodiments herein. MEC support to DSRC may help to reduce latency and scalability by bringing some of the V2X application servers to be executed closer to the "edge." Indeed, MEC may be beneficial from a network infrastructure perspective to support autonomous vehicles on roads. Embodiments herein identify and introduce different approaches and mechanisms for connecting the MEC capability with the DSRC infrastructure to support V2X for autonomous vehicles in various communication scenarios.

MEC may be advantageous with respect to a network infrastructure viewpoint to support autonomous vehicles on roads through (1) facilitating lower latency in distributing messages received from the vehicles to other areas (e.g. intersection collision avoidance applications, etc.); and (2) faster updates to vehicles about changing environments (e.g. obstacle on the road, etc.). Further, the MEC incorporation as described herein may enable scalable support for V2X applications using different radio technologies. In fact, in particular examples, both DSRC RSUs and 3rd Generation Partnership Project (3GPP) RSUs could possibly access application layer services at the same MEC.

In sum, certain embodiments include different implementations and mechanisms for DSRC to leverage MEC capabilities to better support V2X applications for autonomous vehicles in different communication circumstances. Again, these new features in MEC and new deployment models for DSRC may leverage MEC infrastructure and support autonomous driving. First, the features may include, for instance, concurrent connectivity in RSUs to facilitate connectivity with MEC in coverage through cellular connectivity, Ethernet/optical, or legacy Wi-Fi (if existing) and connectivity with vehicles using, for example, IEEE 802.11p WAVE (hereinafter "802.11p WAVE") or DSRC. A second option (e.g., FIG. 3) is the features may include distributed MEC servers at a relatively small-cells level with concurrent Wi-Fi and cellular connectivity to promote connectivity with an RSU through, for example, 802.11p WAVE and connectivity with the macro cell through cellular connectivity. A third option (e.g., FIG. 4) is distributed standalone MEC servers acting as RSUs and supporting cellular connectivity, Ethernet/Optical or even legacy Wi-Fi (if existing) may allow connectivity with upstream MEC servers and connectivity with vehicles employing 802.11p WAVE, for example. The aforementioned three options may be combined, and additional options and variations are applicable.

Thus, certain embodiments join DSRC with MEC road infrastructure and introduce DSRC concurrent co-existence with cellular, optical, or Ethernet connectivity within the same unit (e.g., RSU or micro-server at the edge) and leverage to MEC infrastructure. Such may facilitate relatively wide deployment, better connectivity range, more reliable communication, and the like. Some examples provide for different architecture for DSRC services to extend to the mobile or cellular Edge network infrastructure to support autonomous driving vehicles. V2X services can include a traffic alert, an accident alert, an autonomous driving remote-control command, or an augmented virtual reality service, or any combinations thereof, and the like.

While particular examples employ DSRC/802.11p WAVE of V2X connectivity to leverage the MEC implementation to enhance V2X services, the techniques may also employ other wireless communication technologies having similar characteristics or address similar usages. For example, future 5G or new radio interfaces, future Wi-Fi/802.11 solutions, and so on, may be employed. The 5th generation mobile networks or 5th generation wireless systems, abbreviated 5G, are telecommunications standards beyond the current 4G and International Mobile Telecommunications (IMT)-Advanced standards.

Figure 2:
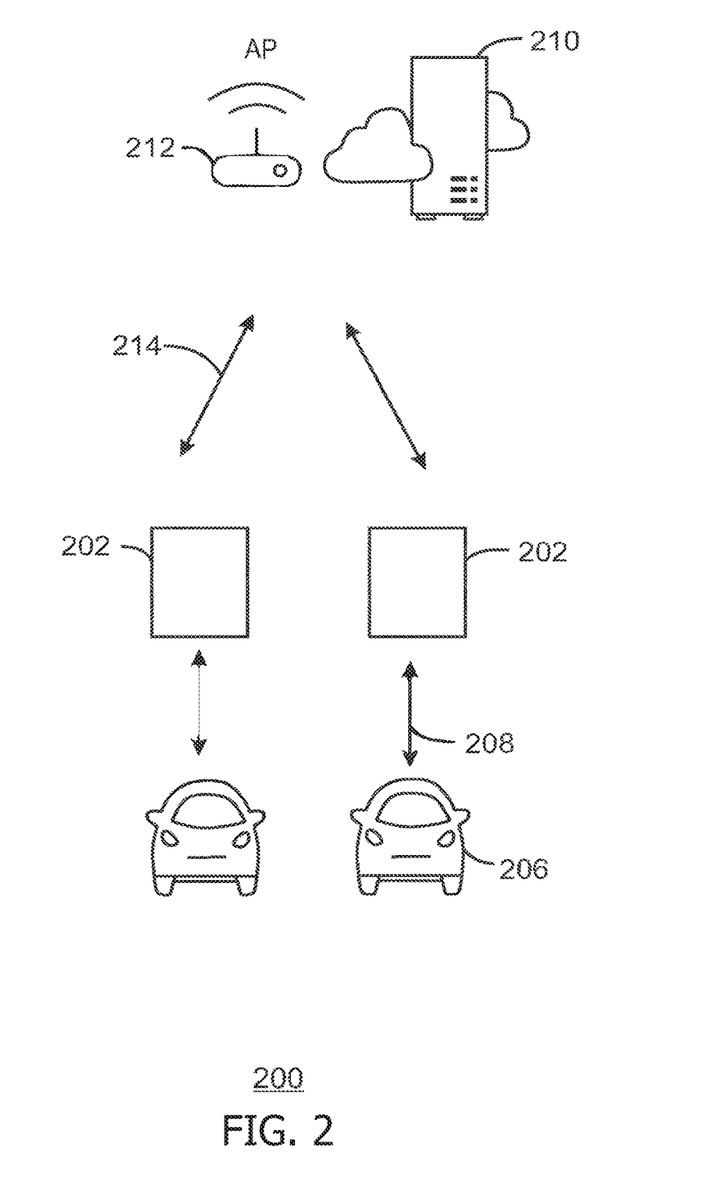
Figure 3:
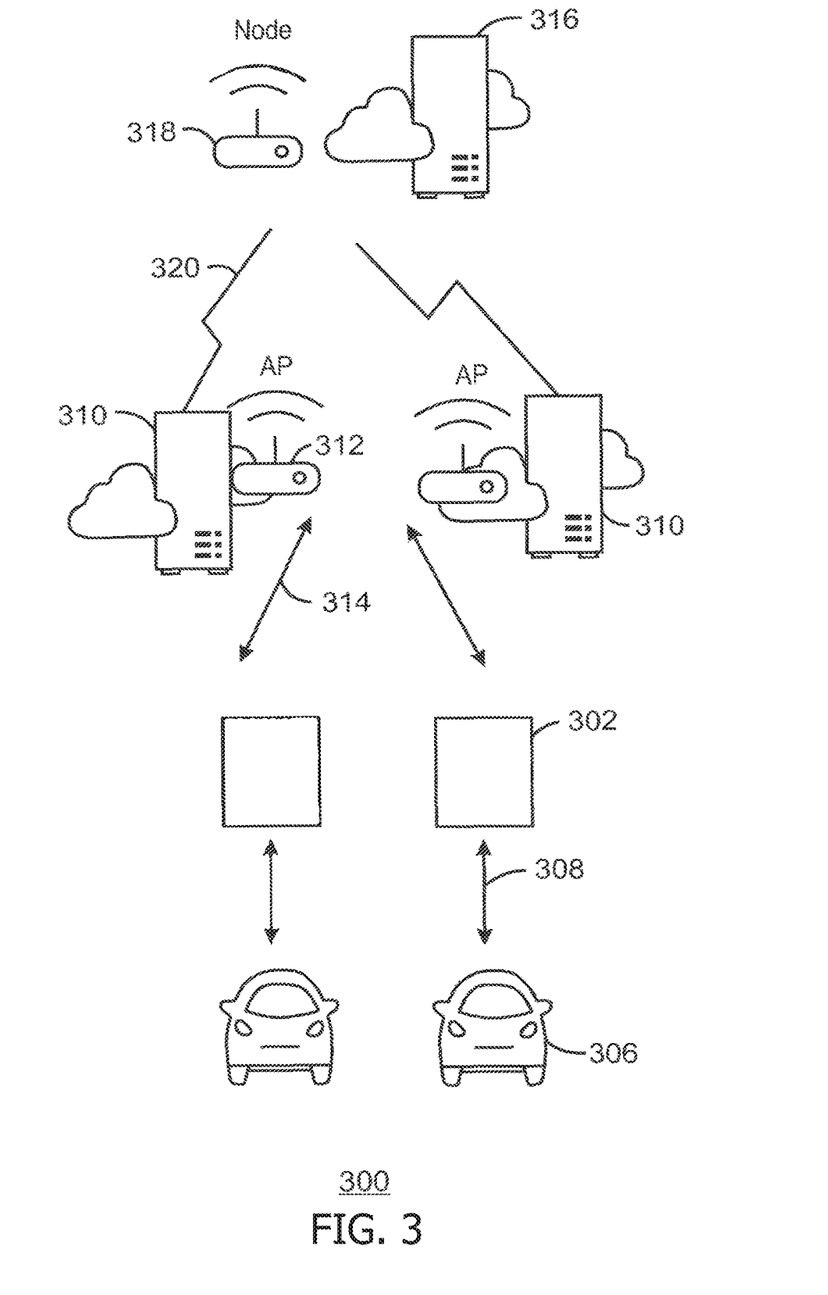
Figure 4:
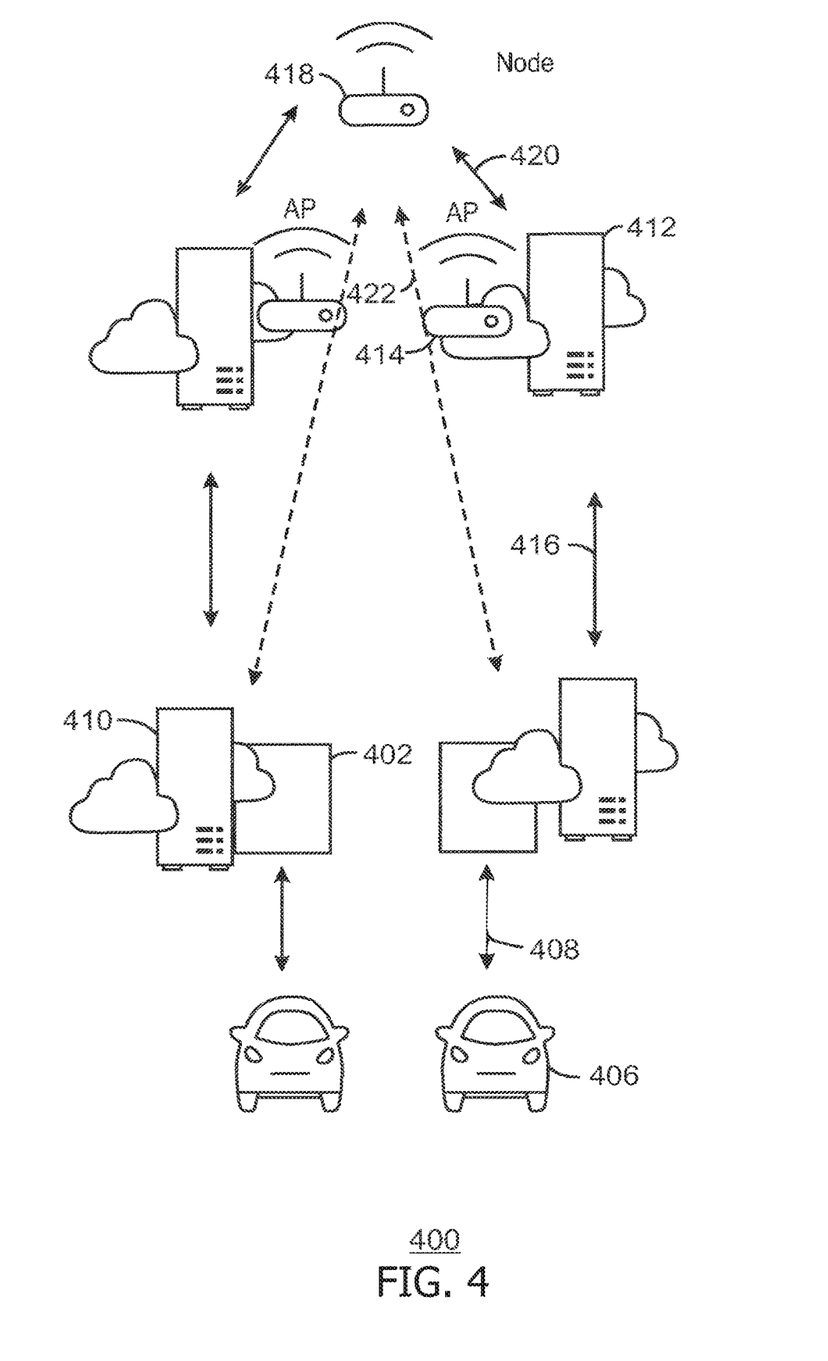

Example architectures and implementations are discussed with respect to FIGS. 2-4. As discussed, the roadside computing device may be communicatively coupled with the edge computing device via Ethernet link, optical link, wireless link, WiFi link or cellular link, or any combination thereof. FIG. 2 is a system 200 for vehicle communication and including roadside computing devices 202 (e.g., RSUs) disposed along one or more roads. The roadside computing devices 202 can be independent devices that have a connection (e.g., IP over media as described) to, for example, the MEC server described below.

In the illustrated example, the roadside computing devices 202 employ DSRC or similar protocol. The roadside computing devices 202 communicate with vehicle computer systems of vehicles 206, as indicated by arrow 208. The vehicles 206 may be traveling or parked along the one or more roads associated with the roadside computing devices 202. The vehicle 206 may travel and connect to different roadside computing devices 202 (e.g., RSUs) along the road. The DSRC or 802.11p WAVE generally operates without a base station subsystem (BSS).

The system 200 includes concurrent dual range connectivity in the roadside computing devices 202. For instance, in a particular example, the system 200 employs 802.11p WAVE with the network 204 to allow the vehicle 206 (e.g., AD vehicle) to connect to the roadside computing devices 202, as indicated by arrow 108. The system 200 employs a long-range connectivity between the roadside computing devices 202 and edge computing device(s) 210 (e.g., remote from the road) such as MEC computing device(s) or MEC server(s), as indicated by arrows 214. This connectivity 214 can be Ethernet or optical including if the remote computing device 210 is not co-located with an eNodeB. The connectivity 214 can be cellular including if the remote computing device 210 is co-located with an eNodeB. Lastly, the connectivity 214 can be legacy Wi-Fi, for example, if the edge computing device 210 is co-located with an access point (AP) 212 such as a wireless router. In sum, the concurrent connectivity of the roadside computing devices of FIG. 2 may facilitate connectivity with MEC in coverage through cellular connectivity, Ethernet/optical, or legacy Wi-Fi (if existing), and connectivity with vehicles 206 using, for example, 802.11p WAVE. The edge computing device 210 can be remote from the road and roadside computing devices 202.

FIG. 3 is a system 300 for vehicle communication and including roadside computing devices 302 (e.g., RSUs) disposed along one or more roads. Similar to the system 200 of FIG. 2, the roadside computing devices 302 may employ DSRC or similar protocol. In some examples, roadside devices 302 are not part of a DSRC network but can join an existing Wi-Fi in which some AP also provide MEC services, for example. Thus, the devices 302 could generally join a network where they can communicate with devices 310, but the 302 devices may generally not need to form a network themselves. The roadside computing devices 302 communicate with vehicle computer systems of vehicles 306, as indicated by arrow 308. The vehicles 306 may be traveling or parked along the one or more roads.

The illustrated embodiment of FIG. 3 provides distributed MEC computing devices 310 (e.g., MEC servers) remote but closer to the roadside computing devices 302. In some examples, the distributed MEC computing devices 310 are associated with access points (APs) 312. Further, in certain examples, the system 300 provides concurrent dual-band Wi-Fi in the roadside computing devices 302. First, the roadside computing devices 302 may couple or connect to vehicles 306, for example, via DSRC 802.11p WAVE. Second, the roadside computing devices 302 may couple or connect to the distributed MEC computing devices 310 via legacy Wi-Fi, as indicated by arrows 314.

The distributed MEC computing devices 310 may couple or connect to an upstream MEC computing device 316 (e.g., MEC server co-located with eNodeB 318) through cellular connectivity (or other connectivity, e.g., Wi-Fi), as indicated by lines 320. This may facilitate aggregation of data collected from AD vehicles and for pushing applications from regional MEC to more localized MEC. The aggregation of data and pushing of applications may be based, for example, on context and geographical considerations to broadcast to vehicles in the local area. A particular implementation example may be, for instance, augmented reality overlay with navigation systems to landmarks in the local area, and the like. In sum, the distributed MEC servers 310 at a relatively small-cell level with concurrent Wi-Fi and cellular connectivity to promote connectivity with a roadside computing device 302 through, for example, 802.11p WAVE, and with the macro cell through cellular connectivity.

FIG. 4 is a system 400 for vehicle communication and including roadside computing devices 402 (e.g., RSUs) disposed along one or more roads and road intersection(s). In some examples, the roadside computing devices 402 utilize DSRC or similar communication. The roadside computing devices 402 communicate with vehicles 406, as indicated by arrow 408. In particular, the roadside computing devices 402 may communicate with vehicle computer systems of vehicles 406. The vehicles 406 may be traveling or idle along the one or more roads and road intersection(s) associated with the roadside computing devices 402.

The system 400 provides distributed standalone computing devices 410 (e.g., MEC computing devices or MEC servers) co-located with the roadside computing devices 402. These distributed standalone computing devices 410 can couple or connect (e.g., directly) with a cellular node (e.g., an eNodeB 418) through cellular connectivity 422. Another option is the distributed standalone computing devices 410 can couple or connect, as indicated by arrows 416, to upstream computing devices 412 (e.g., MEC servers) through Ethernet/optical, or through legacy Wi-Fi if the upstream computing devices are co-located with APs 414, and so on.

Thus, particular examples may include distributed standalone MEC servers acting as RSUs and supporting cellular connectivity, Ethernet/optical, or legacy Wi-Fi (if existing). Such may facilitate connectivity of the distributed standalone MEC servers acting as RSUs with upstream MEC servers and with vehicles 406 employing 802.11p WAVE, for example. Moreover, as can be appreciated, the various components in FIGS. 1-4 may have network interface adapters (not shown) to facilitate coupling and communication with networks of various protocols. The network interface components may include a network interface card (NIC) or on-board network hardware/software, and the like.

The discussion now turns to discovery of MEC applications using DSRC features and extending the MEC applications. Standards such as cellular or WAVE standards (e.g., IEEE Std 1609.0-2013 Guide for WAVE Architecture) may define vehicle communication services (e.g., V2X services) that can be advertised by roadside computing devices (e.g., RSUs). Other relevant standards may include, for instance, IEEE Std 1609.3-2016 and IEEE Std 1609.12-2016. Other standards and guidelines may be applicable.

In the protocol stack of the DSRC devices (e.g., RSUs and on board units or OBUs), each vehicle communication (e.g., V2X) service may be identified, for example, by a service identifier. In some examples, the service identifier may be a provider service identifier (PSID) and, in particular examples, such may be defined by an industry or government standard, for instance. V2X services may run in the MEC computing device or server, and can be accessed by RSUs through various links (e.g., see links described above with respect FIGS. 1-4). The MEC server may advertise service identifiers (e.g., PSIDs) for the MEC server hosted V2X services to the RSUs, or alternatively, RSUs may query one or more MEC services to discover PSIDs supported. For V2X services (e.g., new V2X services) supported by MEC are discovered by the RSUs, the RSUs or proximate MEC (that can be co-located with RSUs) may advertise such services to vehicles. The RSU or proximate MEC co-located with the RSU may advertise the MEC V2X services, for example, through DSRC shared channels (SCH) and associated procedure(s).

As indicated, a DSRC or WAVE system may be a radio communication system intended to provide interoperable services to transportation. These services may include those recognized, for example, by the U.S. National ITS architecture and many others contemplated by the automotive and transportation infrastructure industries around the world, such as V2I, V2V, etc. Examples uses of a service identifier such as the PSID may be specified in standards (e.g., WAVE standards). In general, the PSID may identify advertised provider services that are available, and once messages sent by those services are received, the PSID used to route messages to the appropriate user applications that wish to receive those messages. In some examples, the PSID may also identify sender permissions for certain information. In a particular example, the PSID may reside in the header of WAVE Short Messages (WSM) of the WAVE Short Message Protocol (WSMP). The messages used by WSMP are known as. In general, a WAVE system may advertise available services by way of sending periodic messages known as WAVE Service Advertisements (WSA). Each WSA may include a list of PSIDs for services that are available on the network, as well as information for receiving and processing the WSMs pertaining to each service being advertised.

A service identifier or PSID may be a globally unique integer in some examples. Moreover, each allocated PSID value may be associated with a WAVE service. In certain instances, a WAVE service can be thought of as any application, service, protocol or higher layer entity that resides above the WSMP protocol layer. A PSID may also be associated with an organization that specifies use of that PSID. To facilitate interoperability between WAVE devices, the organization may develop and provide specifications pertaining to the PSID. First, a service provider identifies advertised service opportunities by the PSID values in WSA messages it transmits. Second, the WSMP delivers WSM content to higher layer entities based on the PSID value set by the sender in the WSM message header. Another use of the PSID may be with a security certificate listing the PSID value(s) identifying applications for which a sender is authorized to generate signed secured messages.

As for load distribution, network slicing or next level of MEC support may be involved. V2X services may include traffic services/alerts (non-critical), autonomous driving remote-control commands and accidents alerts (critical), and other services. A hierarchical architecture of MEC devices or servers may support different V2X services based on latency requirements and time criticality. For example, within the same MEC server, network slicing may be a supported feature allocated to different V2X services based on criticality and latency needs of the service. Such may involve providing several slices for one service to promote more acceleration and to meet the latency needs for the service.

In cases where MEC is not present, the nearby MEC resources can be employed and the request for the service routed to the next level of the available MEC. For instance, in the example of FIG. 3, when there is a V2X service arriving but the distributed MEC computing device 310 is not present, the request may be routed to the next level of MEC at computing device 316 at eNodeB 318 to satisfy the service. Lastly, in cases where more than one MEC computing devices or servers (e.g., 104, 210, 310, 412) exist at the same hierarchal level, load balancing of workload may take place in some examples between the MEC servers for better efficiency and more responsiveness. In particular examples, the load balancing can take place through a centralized MEC controller in each local region. The regional or centralized MEC control may track workload size on each MEC server and provide load balancing.

Embodiments may give unique combinations of existing technology (and new technology) to provide new usage and new infrastructure for vehicle communication and vehicle operation including for autonomous vehicles. Connectivity support may not only be provided to autonomous driving vehicles but also to network infrastructure in support of autonomous driving, and to vehicles and associated communication infrastructure generally. Certain embodiments may combine DSRC with cellular and Ethernet or optical connectivity to facilitate vehicle communication and autonomous driving network infrastructure.

Figure 5:
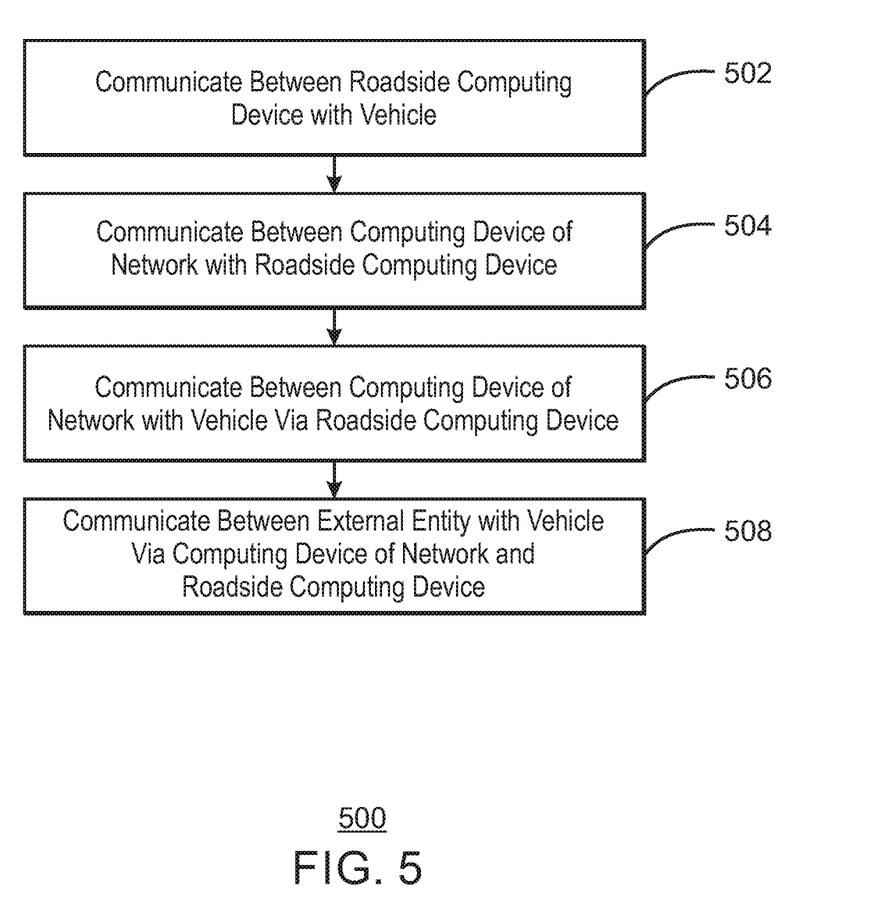
FIG. 5 is a block flow diagram of a method of vehicle communication in accordance with embodiments of the present techniques.

FIG. 5 is a method 500 of vehicle communication. At block 502, the method includes communicating between a roadside computing device (e.g., RSU) and a vehicle. In particular, the roadside computing device may communicate with a vehicle computer system of the vehicle. The roadside computing device may be disposed along a road in which the vehicle is traveling or parked. The roadside computing device may employ DSRC (i.e., 802.11p WAVE) for communication with the vehicle.

At block 504, the method includes communicating between a computing device (e.g., an edge computing unit, a MEC server, etc.) of an access or edge network (e.g., including MEC infrastructure) with the roadside computing device. The access network or edge network may include a cellular network or Wi-Fi network, a fight generation (5G) network, a Multi-Fire network, a sensor network, a mesh network, or any combinations thereof. The communication between the remote computing device (e.g., edge computing device) and the roadside computing device may be by Ethernet link, optical link, cellular link including via a cellular node such as eNodeB, wireless link including legacy W-Fi via an AP, and so forth. The remote computing device may provide a vehicle communication (e.g., V2X) application or service to the roadside computing device. In some examples, a service identifier may be provided. As discussed, in the context of MEC, V2X services may run in the MEC computing device (e.g., server) and which may be accessed by RSUs through a link (e.g., see links described above with respect FIGS. 1-4). Again, via the communication at block 504 (or 506), the MEC server may advertise service identifiers (e.g., PSIDs) for the MEC server-hosted V2X services to the RSUs. Also, the RSUs may query one or more MEC services to discover PSIDs supported.

At block 506, the method includes communicating between the computing device of the access network (e.g., network 102 of FIG. 1) with the vehicle via the roadside computing device. In other words, the communication may be by Ethernet, optical, cellular, or wireless between the remote computing device (e.g., MEC server) and the roadside computing device, and by an IEEE 802.11 standard (e.g., 802.11p WAVE) between the roadside unit and the vehicle. Moreover, for this communication in the context of MEC for a V2X service, the RSU may discover the service, and advertise and provide the service to the vehicle via DSRC or 802.11p WAVE. As also discussed above, a proximate MEC computing device (e.g., 410 of FIG. 4) co-located with the RSU may advertise the MEC V2X service such as through a DSRC shared channel (SCH) and associated procedure.

At block 508, the method includes communicating between an external entity and the vehicle via the remote computing device (e.g., MEC server) and roadside computing device. An external entity may supply and receive information to/from the vehicle computing system via the remote computing device (e.g., MEC server) and roadside computing device. In other words, the external entity may be coupled wired or wirelessly to the remote network which may include a core network or cloud servers, for example. The external entity may be a supplier, service provider, technician, manufacturer, government organization, cellular device, and so on.

Figure 6:
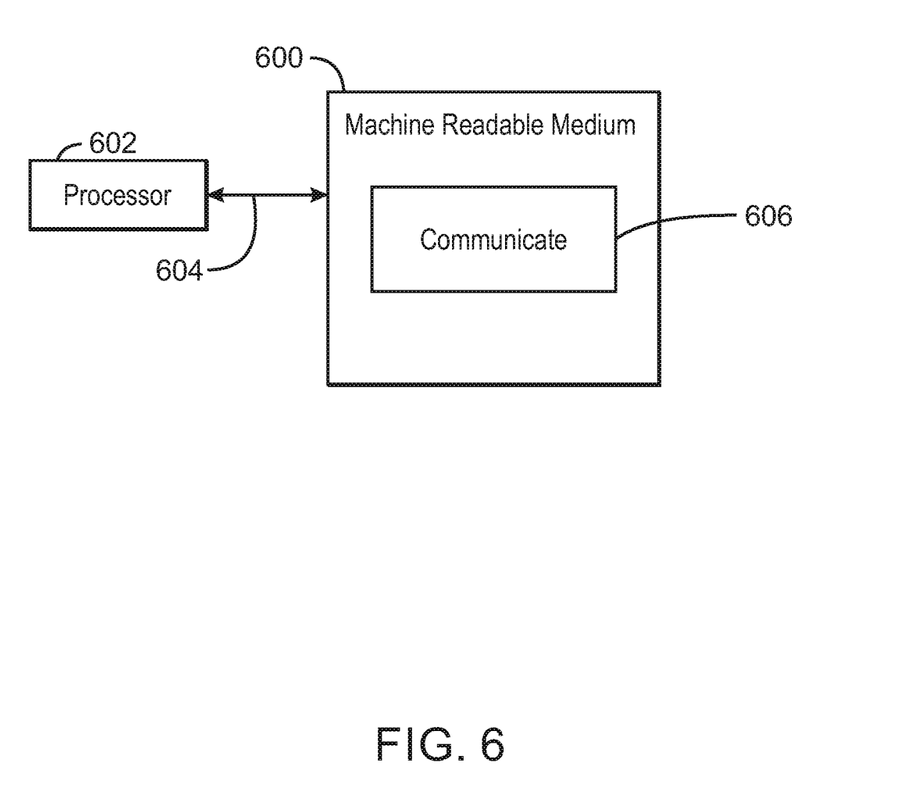
FIG. 6 is a block diagram illustrating a computer-readable medium to facilitate vehicle communication in accordance with embodiments of the present techniques.

FIG. 6 is a block diagram depicting a tangible, non-transitory, computer-readable medium 600 to facilitate vehicle communication. The computer-readable medium 600 may be accessed by a processor 602 over a computer interconnect 604. The processor 602 may be a processor of a computing device or system, a processor of a MEC computing device or server, a processor of a roadside computing device or RSU, or another processor. The tangible, non-transitory, computer-readable medium 600 may include executable instructions or code to direct the 600 to facilitate perform the techniques described herein, such as to implement the vehicle communication and coupling of a MEC server with a RSU.

The various software components discussed herein may be stored on the tangible, non-transitory, computer-readable medium 600, as indicated in FIG. 6. For example, communication code 606 (executable instructions) may direct the processor 602 to the vehicle communication discussed herein, such as configuring the MEC server and RSU to communicate with each other. It should be understood that any number of additional software components not shown in FIG. 6 may be included within the tangible, non-transitory, computer-readable medium 600, depending on the application.

In an embodiment, the code 606 may be executed by the processor 602 of a computing device to direct the computing device (e.g., an MEC device) to communicate with a vehicle computer system of a vehicle on a road, wherein a network (e.g., a cellular network) includes the computing device, wherein to communicate includes to communicate via multiple roadside computing devices (e.g., RSUs) which employ DSRC and disposed along the road, and wherein the computing device is disposed remote from the road and roadside computing devices. The code 606 executed by a processor 602 may direct the computing device to provide a vehicle-to-everything (V2X) service to a roadside computing device. Indeed, the code 606 may be executable by a processor 602 to direct the computing device to communicate with the multiple roadside computing devices. The multiple roadside computing devices may communicate with the vehicle computing system when the vehicle is within range. Lastly, in certain examples, the multiple roadside computing devices may communicate with the access or edge network via the edge computing device.

Figure 7:
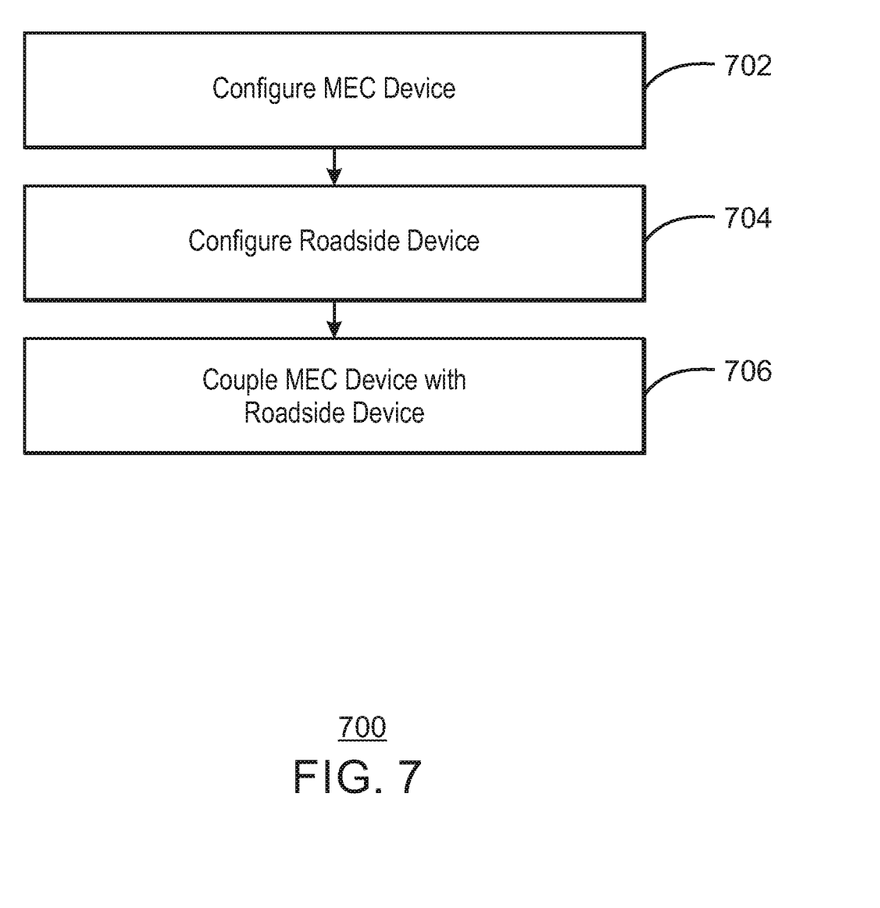
FIG. 7 is a block flow diagram of a method of manufacturing a system for vehicle communication in accordance with embodiments of the present techniques.

FIG. 7 is a method 700 of manufacturing a system for vehicle communication. At block 702, the method includes configuring an MEC computing device such as an MEC server to communicate with roadside computing devices (e.g., RSUs). In one exemplary implementation, the RSUs employ DSRC to communicate with vehicles. The configuring may include coupling the MEC server to the roadside computing device via Ethernet, optical, cellular, wireless, and the like. The configuring may include programming the MEC computing device so communicate with the roadside computing devices. In one example, the MEC computing device is configured to provide a service identifier such as a PSID for a V2X application or service.

At block 704, the method includes configuring a roadside computing device such as a RSU to communicate with the MEC computing device or server. The roadside computing device may communicate with a vehicle or vehicle computer system, such as via wireless, cellular, or 802.11p WAVE (DSRC). The roadside computing device may be disposed along a road in which the vehicle is moving or idle. At block 704, the configuring may include programming the roadside computing device to communicate with MEC computing device (e.g., server). The configuring of the roadside computing device may include communicatively coupling the roadside computing device to the MEC computing device or server via Ethernet, optical, cellular, or wireless, if not already so coupled at block 702.

Thus, at block 706, the method includes the coupling of the MEC computing device with the roadside computing device. Therefore, the MEC computing device may communicate with the roadside computing device. The system may be configured such that the remote computing device may provide a V2X application or service to the roadside computing device. In some examples, as indicated, a service identifier may be provided. As discussed, in the context of MEC, V2X services may run in the MEC computing device (e.g., server) and which may be accessed by roadside computing devices through the aforementioned coupling (e.g., see also FIGS. 1-4). In the present method 700, the MEC server may be programmed or otherwise configured to advertise service identifiers (e.g., PSIDs) for the MEC server-hosted V2X services to the roadside computing device. Also by the method 700, the roadside computing device may be programmed or otherwise configured to query one or more MEC services to discover PSIDs supported.

The method 700 may configure the system for vehicle communication to provide for communication between the MEC computing device with the vehicle via the roadside computing device. Moreover, for this communication in the context of MEC for a V2X service, the roadside computing device may be programmed or otherwise configured to discover a V2X service from the MEC server, and the roadside computing device to advertise and provide the service to the vehicle.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a system for vehicle communication. The system includes a roadside computing device disposed along a road to communicate with a vehicle computing system of a vehicle on the road; and an edge computing device communicatively coupled with the roadside computing device, wherein the edge computing device is disposed remote from the road.

Example 2 includes the system of example 1, including or excluding optional features. In this example, the edge computing device comprises a mobile edge computing (MEC) server.

Example 3 includes the system of any one of examples 1 to 2, including or excluding optional features. In this example, an access network comprises the edge computing device.

Example 4 includes the system of any one of examples 1 to 3, including or excluding optional features. In this example, the roadside computing device is communicatively coupled with the edge computing device via Ethernet, optical, wireless, or cellular, or any combination thereof.

Example 5 includes the system of any one of examples 1 to 4, including or excluding optional features. In this example, the edge computing device to provide vehicle-to-everything (V2X) services to the roadside computing device, and wherein the roadside computing device to provide the V2X services to the vehicle computer system. Optionally, the V2X services comprise a traffic alert, an accident alert, an autonomous driving remote-control command, or an augmented virtual reality service, or any combinations thereof.

Example 6 includes the system of any one of examples 1 to 5, including or excluding optional features. In this example, the roadside computing device employs dedicated short range communications (DSRC) to communicate with the vehicle computing system.

Example 7 includes the system of any one of examples 1 to 6, including or excluding optional features. In this example, the roadside computing device to communicate with the vehicle computing system via an Institute of Electrical and Electronics Engineers (IEEE) 802.11 protocol. Optionally, the IEEE 802.11 protocol comprises IEEE 802.11p Wireless Access in Vehicular Environments (WAVE).

Example 8 includes the system of any one of examples 1 to 7, including or excluding optional features. In this example, the roadside computing device comprises a roadside unit (RSU) to provide data to the edge computing device, and wherein the edge computing device to aggregate data from the RSU.

Example 9 includes the system of any one of examples 1 to 8, including or excluding optional features. In this example, a network comprising the edge computing device comprises a cellular network or Wi-Fi network, or a combination thereof.

Example 10 is a system for vehicle communication. The system includes a roadside computing device disposed along a road to communicate with a vehicle computing system of a vehicle on the road, wherein the roadside computing device to communicate with an edge computing device disposed remote from the road, and wherein the roadside computing device is communicatively coupled with the edge computing device.

Example 11 includes the system of example 10, including or excluding optional features. In this example, an access network comprises the edge computing device, wherein the edge computing device comprises a mobile edge computing (MEC) server, wherein the MEC server is coupled to the roadside computing device via Ethernet, optical, wireless, or cellular, or any combinations thereof, wherein the MEC server to provide vehicle-to-everything (V2X) services to the roadside computing device, and wherein the roadside computing device to provide the V2X services to the vehicle computer system.

Example 12 includes the system of any one of examples 10 to 11, including or excluding optional features. In this example, an access network comprises the edge computing device, wherein the edge computing device comprises a MEC server, and wherein the roadside computing device employs dedicated short range communications (DSRC). Optionally, the MEC server comprises multiple MEC servers, wherein the access network comprises an MEC controller to load balance workload between the multiple MEC servers, the workload comprising provisioning of V2X services to the roadside computing device. Optionally, the access network comprises an edge network or a mobile edge computing (MEC) network, and wherein the roadside computing devices to communicate with the vehicle computing system via the DSRC comprising an Institute of Electrical and Electronics Engineers (IEEE) 802.11 standard.

Example 13 is a method of vehicle communication. The method includes communicating from a computing device of a network with a vehicle computer system of a vehicle on a road, the computing device disposed remote from the road, wherein the communicating comprises communicating via a roadside computing device disposed along the road.

Example 14 includes the method of example 13, including or excluding optional features. In this example, communicating comprises the roadside computing device communicating with the vehicle computing system via dedicated short range communications (DSRC).

Example 15 includes the method of any one of examples 13 to 14, including or excluding optional features. In this example, the communicating comprises communicating from the computing device to the roadside computing device via Ethernet, optical, wireless, or cellular, or any combination thereof, and communicating from the roadside computing device to the vehicle computer system via an Institute of Electrical and Electronics Engineers (IEEE) 802.11 standard. Optionally, the IEEE 802.11 standard comprises IEEE 802.11p Wireless Access in Vehicular Environments (WAVE).

Example 16 includes the method of any one of examples 13 to 15, including or excluding optional features. In this example, the method includes providing a vehicle-to-everything (V2X) service from the computing device to the roadside computing device, wherein the computing device comprises a mobile edge computing (MEC) device, and wherein the network comprises a cellular network or a Wi-Fi network; and providing the V2X service from the roadside computing device to the vehicle computer system.

Example 17 is a tangible, non-transitory computer-readable medium. The tangible, non-transitory computer-readable medium includes code or instructions that direct the processor to of an edge computing device to direct the edge computing device to communicate with a vehicle computer system of a vehicle on a road, wherein to communicate comprises to communicate via a roadside computing device disposed along the road, wherein the edge computing device is disposed remote from the road, and wherein an edge network comprises the edge computing device.

Example 18 includes the tangible, non-transitory computer-readable medium of example 17, including or excluding optional features. In this example, the edge network comprises a cellular network or a Wi-Fi network, or both, and wherein the edge computing device comprises a mobile edge computing (MEC) device, the roadside computing device employs dedicated short range communications (DSRC) to communicate with the vehicle computer system, and the roadside computing device comprises a roadside unit (RSU). Optionally, the code executable by a processor to direct the MEC device to provide a vehicle-to-everything (V2X) service to the vehicle computer system via the roadside computing device.

Example 19 includes the tangible, non-transitory computer-readable medium of any one of examples 17 to 18, including or excluding optional features. In this example, the code executable by a processor to direct the edge computing device to communicate with the roadside computing device, wherein the roadside computing device to communicate with the vehicle computing system.

Example 20 is a system for vehicle communication. The system includes a roadside computing device disposed along a road to communicate with a vehicle computing system of a vehicle on the road; and an edge computing device communicatively coupled with the roadside computing device, wherein the edge computing device is disposed remote from the road and is a component of an access network.

Example 21 includes the system of example 20, including or excluding optional features. In this example, the edge computing device comprises a mobile edge computing (MEC) server.

Example 22 includes the system of any one of examples 20 to 21, including or excluding optional features. In this example, the roadside computing device is communicatively coupled with the edge computing device via Ethernet, optical, wireless, or cellular, or any combination thereof.

Example 23 includes the system of any one of examples 20 to 22, including or excluding optional features. In this example, the edge computing device to provide vehicle-to-everything (V2X) services to the roadside computing device, and wherein the roadside computing device to provide the V2X services to the vehicle computer system. Optionally, the V2X services comprise a traffic alert, an accident alert, an autonomous driving remote-control command, or an augmented virtual reality service, or any combinations thereof.

Example 24 includes the system of any one of examples 20 to 23, including or excluding optional features. In this example, the roadside computing device employs dedicated short range communications (DSRC) to communicate with the vehicle computing system.

Example 25 includes the system of any one of examples 20 to 24, including or excluding optional features. In this example, the access network comprises a cellular network or Wi-Fi network, or a combination thereof.

Example 26 includes the system of any one of examples 20 to 25, including or excluding optional features. In this example, the access network comprises an edge network.

Example 27 includes the system of any one of examples 20 to 26, including or excluding optional features. In this example, the access network comprises an MEC network.

Example 28 is a method of vehicle communication. The method includes communicating from an edge computing device of an access network with a vehicle computer system of a vehicle on a road, the edge computing device disposed remote from the road, wherein the communicating comprises communicating via a roadside computing device disposed along the road.

Example 29 includes the method of example 28, including or excluding optional features. In this example, communicating comprises the roadside computing device communicating with the vehicle computing system via dedicated short range communications (DSRC).

Example 30 includes the method of any one of examples 28 to 29, including or excluding optional features. In this example, the communicating comprises: communicating from the edge computing device to the roadside computing device via Ethernet, optical, wireless, or cellular, or any combination thereof; and communicating from the roadside computing device to the vehicle computer system via an Institute of Electrical and Electronics Engineers (IEEE) 802.11 standard. Optionally, the IEEE 802.11 standard comprises IEEE 802.11p Wireless Access in Vehicular Environments (WAVE).

Example 31 includes the method of any one of examples 28 to 30, including or excluding optional features. In this example, the method includes providing a vehicle-to-everything (V2X) service from the computing device to the roadside computing device, wherein the computing device comprises a mobile edge computing (MEC) device, and wherein the network comprises a cellular network or a Wi-Fi network; and providing the V2X service from the roadside computing device to the vehicle computer system.

Example 32 is a tangible, non-transitory computer-readable medium. The tangible, non-transitory computer-readable medium includes code or instructions that direct the processor of an edge computing device to direct the edge computing device to communicate with a vehicle computer system of a vehicle on a road, wherein to communicate comprises to communicate via a roadside computing device disposed along the road, wherein the edge computing device is disposed remote from the road.

Example 33 includes the tangible, non-transitory computer-readable medium of example 32, including or excluding optional features. In this example, an access network comprises the edge computing device.

Example 34 includes the tangible, non-transitory computer-readable medium of any one of examples 32 to 33, including or excluding optional features. In this example, an edge network comprises the edge computing device.

Example 35 includes the tangible, non-transitory computer-readable medium of any one of examples 32 to 34, including or excluding optional features. In this example, the edge computing device comprises a mobile edge computing (MEC) device, the roadside computing device employs dedicated short range communications (DSRC) to communicate with the vehicle computer system, and wherein the code executable by the processor to direct the MEC device to provide a vehicle-to-everything (V2X) service to the vehicle computer system via the roadside computing device.

Example 36 is a system for vehicle communication. The system includes means for communicating from a computing device of a network with a vehicle computer system of a vehicle on a road, the computing device disposed remote from the road, wherein the means for communicating comprises means for communicating via a roadside computing device disposed along the road.

Example 37 includes the system of example 36, including or excluding optional features. In this example, the means for communicating comprises the roadside computing device communicating with the vehicle computing system via dedicated short range communications (DSRC).

Example 38 includes the system of any one of examples 36 to 37, including or excluding optional features. In this example, the means for communicating comprises: means for communicating from the computing device to the roadside computing device via Ethernet, optical, wireless, or cellular, or any combination thereof; and means for communicating from the roadside computing device to the vehicle computer system via an Institute of Electrical and Electronics Engineers (IEEE) 802.11 standard. Optionally, the IEEE 802.11 standard comprises IEEE 802.11p Wireless Access in Vehicular Environments (WAVE).

Example 39 includes the system of any one of examples 36 to 38, including or excluding optional features. In this example, the system includes means for providing a vehicle-to-everything (V2X) service from the computing device to the roadside computing device, wherein the computing device comprises a mobile edge computing (MEC) device, and wherein the network comprises a cellular network or a Wi-Fi network; and means for providing the V2X service from the roadside computing device to the vehicle computer system.

Example 40 is a system for vehicle communication. The system includes means for communicating from an edge computing device of an access network with a vehicle computer system of a vehicle on a road, the edge computing device disposed remote from the road, wherein the communicating comprises communicating via a roadside computing device disposed along the road.

Example 41 includes the system of example 40, including or excluding optional features. In this example, the means for communicating comprises the roadside computing device communicating with the vehicle computing system via dedicated short range communications (DSRC).

Example 42 includes the system of any one of examples 40 to 41, including or excluding optional features. In this example, the means for communicating comprises: means for communicating from the edge computing device to the roadside computing device via Ethernet, optical, wireless, or cellular, or any combination thereof; and means for communicating from the roadside computing device to the vehicle computer system via an Institute of Electrical and Electronics Engineers (IEEE) 802.11 standard. Optionally, the IEEE 802.11 standard comprises IEEE 802.11p Wireless Access in Vehicular Environments (WAVE).

Example 43 includes the system of any one of examples 40 to 42, including or excluding optional features. In this example, the system includes means for providing a vehicle-to-everything (V2X) service from the computing device to the roadside computing device, wherein the computing device comprises a mobile edge computing (MEC) device, and wherein the network comprises a cellular network or a Wi-Fi network; and means for providing the V2X service from the roadside computing device to the vehicle computer system.

Example 44 is a system for vehicle communication. The system includes a roadside computing device to communicate with a computing system of a vehicle; and an edge computing device communicatively coupled with the roadside computing device, wherein the edge computing device is disposed remote from the road.

Example 45 includes the system of example 44, including or excluding optional features. In this example, the edge computing device comprises a mobile edge computing (MEC) server.

Example 46 includes the system of any one of examples 44 to 45, including or excluding optional features. In this example, the edge computing device is comprised within an access network, wherein remote comprises at least one kilometer, wherein the roadside computing is disposed along the road, and wherein the vehicle is on the road. Optionally, the access network comprises a cellular network or Wi-Fi network, a fight generation (5G) network, a Multi-Fire network, a sensor network, a mesh network or any combinations thereof.

Example 47 includes the system of any one of examples 44 to 46, including or excluding optional features. In this example, the roadside computing device is communicatively coupled with the edge computing device via Ethernet link, optical link, wireless link, WiFi link or cellular link, or any combination thereof.

Example 48 includes the system of any one of examples 44 to 47, including or excluding optional features. In this example, the edge computing device provides services to the roadside computing device, and wherein the roadside computing device provides the services to the computer system. Optionally, the services comprise a traffic alert, an accident alert, an autonomous driving remote-control command, or an augmented virtual reality service, or any combinations thereof.

Example 49 includes the system of any one of examples 44 to 48, including or excluding optional features. In this example, the roadside computing device communicate with the computing system via a dedicated short range communications (DSRC) protocol.

Example 50 includes the system of any one of examples 44 to 49, including or excluding optional features. In this example, the roadside computing device communicates with the vehicle computing system via an Institute of Electrical and Electronics Engineers (IEEE) 802.11 protocol. Optionally, the IEEE 802.11 protocol comprises IEEE 802.11p Wireless Access in Vehicular Environments (WAVE).

Example 51 includes the system of any one of examples 44 to 50, including or excluding optional features. In this example, the roadside computing device comprises a roadside unit (RSU) to provide data to the edge computing device, and wherein the edge computing device to aggregate data from the RSU.

Example 52 is a system for vehicle communication. The system includes a roadside computing device disposed along a road to communicate with a vehicle computing system of a vehicle on the road, wherein the roadside computing device to communicate with an edge computing device disposed remote from the road, and wherein the roadside computing device is communicatively coupled with the edge computing device.

Example 53 includes the system of example 52, including or excluding optional features. In this example, an access network comprises the edge computing device, wherein the edge computing device comprises a mobile edge computing (MEC) server, wherein the MEC server is coupled to the roadside computing device via Ethernet, optical, wireless, or cellular, or any combinations thereof, wherein the MEC server to provide vehicle-to-everything (V2X) services to the roadside computing device, and wherein the roadside computing device to provide the V2X services to the vehicle computer system.

Example 54 includes the system of any one of examples 52 to 53, including or excluding optional features. In this example, an access network comprises the edge computing device, wherein the edge computing device comprises a MEC server, and wherein the roadside computing device employs dedicated short range communications (DSRC). Optionally, the MEC server comprises multiple MEC servers, wherein the access network comprises an MEC controller to load balance workload between the multiple MEC servers, the workload comprising provisioning of V2X services to the roadside computing device. Optionally, the access network comprises an edge network or a mobile edge computing (MEC) network, and wherein the roadside computing devices to communicate with the vehicle computing system via the DSRC comprising an Institute of Electrical and Electronics Engineers (IEEE) 802.11 standard.

Example 55 is a system for vehicle communication. The system includes an edge computing unit of an access network, the edge computing unit communicatively coupled with a roadside computing device that communicates with a vehicle computing system of a vehicle, wherein the roadside computing device is disposed remote from the edge computing unit.

Example 56 includes the system of example 55, including or excluding optional features. In this example, the edge computing unit comprises a mobile edge computing (MEC) server, wherein the MEC server is communicatively coupled to the roadside computing device via Ethernet, optical, wireless, or cellular, or any combinations thereof, and wherein the MEC server to provide vehicle-to-everything (V2X) services to the roadside computing device. Optionally, the system includes an MEC controller in the access network, wherein the MEC server comprises multiple MEC servers, wherein the MEC controller load balances workload between the multiple MEC servers, the workload comprising provisioning of the V2X services to the roadside computing device.

Example 57 includes the system of any one of examples 55 to 56, including or excluding optional features. In this example, the roadside computing device employs dedicated short range communications (DSRC). Optionally, the access network comprises an edge network or a mobile edge computing (MEC) network, and wherein the roadside computing devices to communicate with the vehicle computing system via the DSRC comprising an Institute of Electrical and Electronics Engineers (IEEE) 802.11 standard.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for vehicle communication, comprising:
a roadside computing device configured to communicate with a computing system of a vehicle via a dedicated short range communications (DSRC) protocol; and
a mobile edge computing (MEC) server communicatively coupled with the roadside computing device,
wherein the MEC server is disposed remote from the roadside computing device, and
wherein the roadside computing device is configured to concurrently communicate with the computing system of the vehicle via the DRSC protocol and the MEC server via a separate communication protocol that is different than the DRSC protocol.

2. The system of claim 1, wherein:
the MEC server is comprised within an access network,
the MEC server is disposed remote from the roadside computing device by at least one kilometer,
the roadside computing device is disposed along the road, and
the vehicle is on the road.

3. The system of claim 2, wherein the access network comprises at least one of a cellular network, a Wi-Fi network, a five generation (5G) network, a MulteFire network, a sensor network, or a mesh network.

4. The system of claim 1, wherein the roadside computing device is communicatively coupled with the MEC server via at least one of an Ethernet link, an optical link, a wireless link, a WiFi link, or a cellular link.

5. The system of claim 1, wherein the MEC server is configured to provide services to the roadside computing device, and
wherein the roadside computing device is configured to provide the services to the computing system of the vehicle.

6. The system of claim 5, wherein the services provided by the roadside computing device comprise at least one of a traffic alert, an accident alert, an autonomous driving remote-control command, or an augmented virtual reality service.

7. The system of claim 1, wherein the roadside computing device is configured to communicate with the computing system of the vehicle via an Institute of Electrical and Electronics Engineers (IEEE) 802.11 protocol.

8. The system of claim 7, wherein the IEEE 802.11 protocol comprises IEEE 802.11p Wireless Access in Vehicular Environments (WAVE).

9. The system of claim 1, wherein the roadside computing device comprises a roadside unit (RSU) configured to provide data to the MEC server, and
wherein the MEC server is configured to aggregate data received from the RSU.

10. The system of claim 1, wherein:
the MEC server is from among a plurality of distributed MEC servers,
each one of the plurality of distributed MEC servers is associated with a respectively coupled access point (AP), and
the roadside computing device is configured to concurrently communicate with the computing system of the vehicle via the DRSC protocol and the plurality of distributed MEC servers via each respectively coupled AP using the separate communication protocol that is different than the DRSC protocol.

11. The system of claim 1, wherein:
the roadside computing device is from among a plurality of roadside devices,
the MEC server is from among a plurality of first distributed MEC servers and a plurality of second distributed MEC servers,
each one of the plurality of first distributed MEC servers is configured to communicate with an eNodeB and is associated with a respectively coupled access point (AP),
each one of the plurality of second distributed MEC servers is co-located with a respective one of the plurality of roadside devices, and
each one of the plurality of roadside devices is configured to concurrently communicate with the computing system of the vehicle via the DRSC protocol and with the eNode B via the plurality of first distributed MEC servers using the respectively coupled APs in accordance with the separate communication protocol that is different than the DRSC protocol.

12. The system of claim 1, wherein:
the roadside computing device is from among a plurality of roadside devices,
the MEC server is from among a plurality of first distributed MEC servers and a plurality of second distributed MEC servers,
each one of the plurality of first distributed MEC servers is configured to communicate with an eNodeB and is associated with a respectively coupled access point (AP),
each one of the plurality of second distributed MEC servers is co-located with a respective one of the plurality of roadside devices, and
each one of the plurality of roadside devices is configured to concurrently communicate with the computing system of the vehicle via the DRSC protocol and with the eNode B via the plurality of second distributed MEC servers in accordance with a cellular communication protocol that is different than the DRSC protocol.

13. A system for vehicle communication, comprising:
a roadside computing device disposed along a road and configured to communicate with a vehicle computing system of a vehicle on the road via a dedicated short range communications (DSRC) protocol,
wherein the roadside computing device is configured to communicate with a mobile edge computing (MEC) server disposed remote from the road,
wherein the roadside computing device is communicatively coupled with the MEC server, and
wherein the roadside computing device is configured to concurrently communicate with the vehicle computing system via the DRSC protocol and the MEC server via a separate communication protocol that is different than the DRSC protocol.

14. The system of claim 13, wherein:
an access network comprises the MEC server,
the MEC server is coupled to the roadside computing device via at least one of an Ethernet, optical, wireless, or cellular connection,
the MEC server is configured to provide vehicle-to-everything (V2X) services to the roadside computing device, and
the roadside computing device is configured to provide the V2X services to the vehicle computing system.

15. The system of claim 13, wherein an access network comprises the MEC server.

16. The system of claim 15, wherein the MEC server comprises multiple MEC servers, and wherein the access network comprises an MEC controller configured to load balance workload between the multiple MEC servers, the workload comprising provisioning of V2X services to the roadside computing device.

17. The system of claim 15, wherein the access network comprises an edge network or a mobile edge computing (MEC) network, and wherein the roadside computing device is configured to communicate with the vehicle computing system via the DSRC protocol comprising an Institute of Electrical and Electronics Engineers (IEEE) 802.11 standard.

18. A system for vehicle communication, comprising:
a mobile edge computing (MEC) server of an access network, the MEC server communicatively coupled with a roadside computing device that is configured to communicate with a vehicle computing system of a vehicle via a dedicated short range communications (DSRC) protocol,
wherein the roadside computing device is disposed remote from the MEC server, and
wherein the roadside computing device is configured to concurrently communicate with the vehicle computing system via the DRSC protocol and the MEC server via a separate communication protocol that is different than the DRSC protocol.

19. The system of claim 18, wherein:
the MEC server is communicatively coupled to the roadside computing device via at least one of an Ethernet, optical, wireless, or cellular connection, and
wherein the MEC server is configured to provide vehicle-to everything (V2X) services to the roadside computing device.

20. The system of claim 19, further comprising an MEC controller in the access network,
wherein the MEC server comprises multiple MEC servers,
wherein the MEC controller is configured to load balance workload between the multiple MEC servers, and
wherein the workload comprises provisioning of the V2X services to the roadside computing device.

21. The system of claim 18, wherein the access network comprises an edge network or a mobile edge computing (MEC) network, and
wherein the roadside computing device is configured to communicate with the vehicle computing system via the DSRC protocol comprising an Institute of Electrical and Electronics Engineers (IEEE) 802.11 standard.

22. A tangible, non-transitory, computer-readable medium comprising code executable by a processor of a mobile edge computing (MEC) server to cause the MEC server to communicate with a vehicle computer system of a vehicle on a road, the communications with the vehicle computer system including communications via a roadside computing device disposed along the road that communicates with the vehicle computer system via a dedicated short range communications (DSRC) protocol,
wherein the MEC server is disposed remote from the road,
wherein an edge network comprises the MEC server, and
wherein the roadside computing device is configured to concurrently communicate with the vehicle computing system via the DRSC protocol and the MEC server via a separate communication protocol that is different than the DRSC protocol.

23. The tangible, non-transitory, computer-readable medium of claim 22, wherein:
the edge network comprises at least one of a cellular network or a Wi-Fi network, and
wherein the roadside computing device comprises a roadside unit (RSU).

24. The tangible, non-transitory, computer-readable medium of claim 23, wherein the code is further executable by the processor of the MEC server to cause the MEC server to provide a vehicle-to-everything (V2X) service to the vehicle computer system via the roadside computing device.

25. The tangible, non-transitory, computer-readable medium of claim 22,
wherein the code is further executable by the processor of the MEC server to cause the MEC server to communicate with the roadside computing device, and
wherein the roadside computing device is configured to communicate with the vehicle computing system.

* * * * *